United States Patent
Sieberg

(10) Patent No.: US 6,942,472 B2
(45) Date of Patent: Sep. 13, 2005

(54) HEAD PRESSURE RELIEF ASSEMBLY

(75) Inventor: Edward A. Sieberg, Jackson, TN (US)

(73) Assignee: DeVilbiss Air Power Company, Jackson, TN (US)

( * ) Notice: Subject to any disclaimer, the term of this patent is extended or adjusted under 35 U.S.C. 154(b) by 268 days.

(21) Appl. No.: 10/403,802

(22) Filed: Mar. 31, 2003

(65) Prior Publication Data

US 2003/0185695 A1 Oct. 2, 2003

Related U.S. Application Data

(60) Provisional application No. 60/369,536, filed on Apr. 2, 2002, and provisional application No. 60/368,882, filed on Mar. 29, 2002.

(51) Int. Cl.$^7$ .............................................. F04B 41/00
(52) U.S. Cl. ...................... 417/441; 417/571; 417/569; 417/565; 137/856; 137/512.15
(58) Field of Search ................................ 417/441, 571, 417/569, 565; 137/512.15

(56) References Cited

U.S. PATENT DOCUMENTS

| | | | |
|---|---|---|---|
| 1,133,792 A | | 3/1915 | Cheney |
| 3,241,748 A | * | 3/1966 | Cramer et al. ......... 137/512.15 |
| 3,545,887 A | * | 12/1970 | Werner ....................... 417/307 |
| 3,889,646 A | | 6/1975 | Harper et al. .............. 123/48 D |
| 3,998,571 A | * | 12/1976 | Falke .......................... 417/569 |
| 4,108,577 A | * | 8/1978 | Brucken et al. .......... 417/222.1 |
| 4,432,698 A | | 2/1984 | Shirakuma et al. ............ 417/27 |
| 4,459,817 A | | 7/1984 | Inagaki et al. .............. 62/196.3 |
| 4,472,112 A | * | 9/1984 | Unger .......................... 417/311 |
| 5,100,306 A | * | 3/1992 | Moran et al. ................ 417/571 |
| 5,112,198 A | * | 5/1992 | Skinner ....................... 417/269 |
| 5,316,446 A | * | 5/1994 | Kimura et al. .............. 417/269 |
| 5,562,431 A | * | 10/1996 | Plummer ..................... 417/569 |
| 5,607,287 A | * | 3/1997 | Ikeda et al. ................. 417/269 |
| 6,513,544 B1 | * | 2/2003 | Farag et al. ........... 137/512.15 |
| 2002/0159894 A1 | * | 10/2002 | Fujii et al. .................. 417/269 |

* cited by examiner

*Primary Examiner*—Cheryl Tyler
*Assistant Examiner*—Emmanuel Sayoc
(74) *Attorney, Agent, or Firm*—Suiter West PC LLO

(57) ABSTRACT

A head pressure relief assembly for relieving pressure in the head assembly of an air compressor may include an exhaust valve post formed in the head assembly and an exhaust valve assembly comprised of a flapper valve. An aperture may be formed through the exhaust valve post for venting the head assembly prior to start of the compressor assembly. The flapper valve is capable of engaging the exhaust valve post to close the aperture at least partially for preventing flow from the head assembly through the aperture during the compression stroke of the compressor assembly piston. A head pressure relief assembly may also include an aperture disposed in the head assembly, a connecting tube therefor, or a check valve.

21 Claims, 7 Drawing Sheets

HEAD PRESSURE RELIEF ASSEMBLY

CROSS REFERENCE TO RELATED APPLICATIONS

The present application claims the benefit under 35 U.S.C. § 119(e) of U.S. provisional patent Ser. No. 60/368,882, entitled: Head Pressure Relief Assembly, filed on Mar. 29, 2002, and U.S. provisional patent Ser. No. 60/369,536, entitled: Head Pressure Relief Assembly, filed on Apr. 2, 2002. U.S. provisional patent Ser. Nos. 60/368,882 and 60/369,536 are herein incorporated by reference in their entirety.

TECHNICAL FIELD OF THE INVENTION

The present invention generally relates to the field of air compressors having a compressor including a head assembly capable of porting a gas such as air under pressure and more particularly to a head pressure relief apparatus for the head assembly of such an air compressor.

BACKGROUND ART

Air compressors used to provide compressed air for operating air powered tools such as nailing tools, spray painting tools, inflation chucks, and the like typically include an engine or motor coupled to a compressor and mounted to a compressed air storage tank. The compressor includes a head assembly, connecting tubing and a check valve that supplies atmospheric air to the piston assembly and delivers compressed air from the piston assembly to the compressed air storage tank.

Before the compressor is started, it is desirable to relieve pressure from the exhaust cavity of the head assembly to reduce the load placed on the engine or motor. Consequently, air compressors usually include a valve, commonly referred to as the pressure switch unloader valve, and a pressure relief tube, which allow air to be vented from the head assembly to the atmosphere when the compressor is turned off.

In many applications, it is desirable to simplify the design of an air compressor in order to realize savings in manufacturing costs, maintenance costs, weight, and the like. In such applications, it may be advantageous to reduce the complexity of the air compressor by eliminating the pressure switch unloader and pressure relief tube. Consequently, it would be advantageous to provide a mechanism by which pressure may be vented from the head assembly. It would further be desirable to vent this pressure when the compressor is not running, but to prevent such venting when the compressor is running.

SUMMARY OF THE INVENTION

Accordingly, the present invention is directed to a head pressure relief assembly for relieving pressure in the head assembly of a compressor. In one exemplary embodiment, the head pressure relief assembly includes an exhaust valve post formed in the head assembly and an exhaust valve assembly. An aperture is formed through the exhaust valve post for venting the head assembly before the start of the compressor assembly. The exhaust valve assembly is capable of engaging the exhaust valve post to close the aperture at least partially for preventing flow from the head assembly through the aperture during the compression stroke of the compressor assembly piston. In another exemplary embodiment, the head pressure relief assembly may include one or more small holes in the head assembly, connecting tubing, and check valve, through which compressed air in the exhaust cavity of the head assembly may vent.

It is to be understood that both the forgoing general description and the following detailed description are exemplary and explanatory only and are not necessarily restrictive of the invention as claimed. The accompanying drawings, which are incorporated in and constitute a part of the specification, illustrate an embodiment of the invention and together with the general description, serve to explain the principles of the invention.

BRIEF DESCRIPTION OF THE DRAWINGS

The numerous advantages of the present invention may be better understood by those skilled in the art by reference to the accompanying figures in which.

DETAILED DESCRIPTION OF THE INVENTION

The present invention provides a head pressure relief assembly for relieving pressure in the head assembly of a compressor in an air compressor. In one exemplary embodiment, the head pressure relief assembly includes an exhaust valve post formed in the head assembly and an exhaust valve assembly. An aperture is formed through the exhaust valve post for venting the head assembly during start of the compressor assembly. The exhaust valve assembly is comprised of a flapper valve capable of engaging the exhaust valve post to at least partially close the aperture for preventing flow from the head assembly through the aperture during the compression stroke of the compressor assembly piston. In another exemplary embodiment, the head pressure relief assembly may include one or more small holes in the head assembly, connecting tubing, and check valve, through which compressed air in the exhaust cavity of the head assembly may vent. Reference will now be made in detail to the presently preferred embodiments of the invention, examples of which are illustrated in the accompanying drawings.

Figure 1:
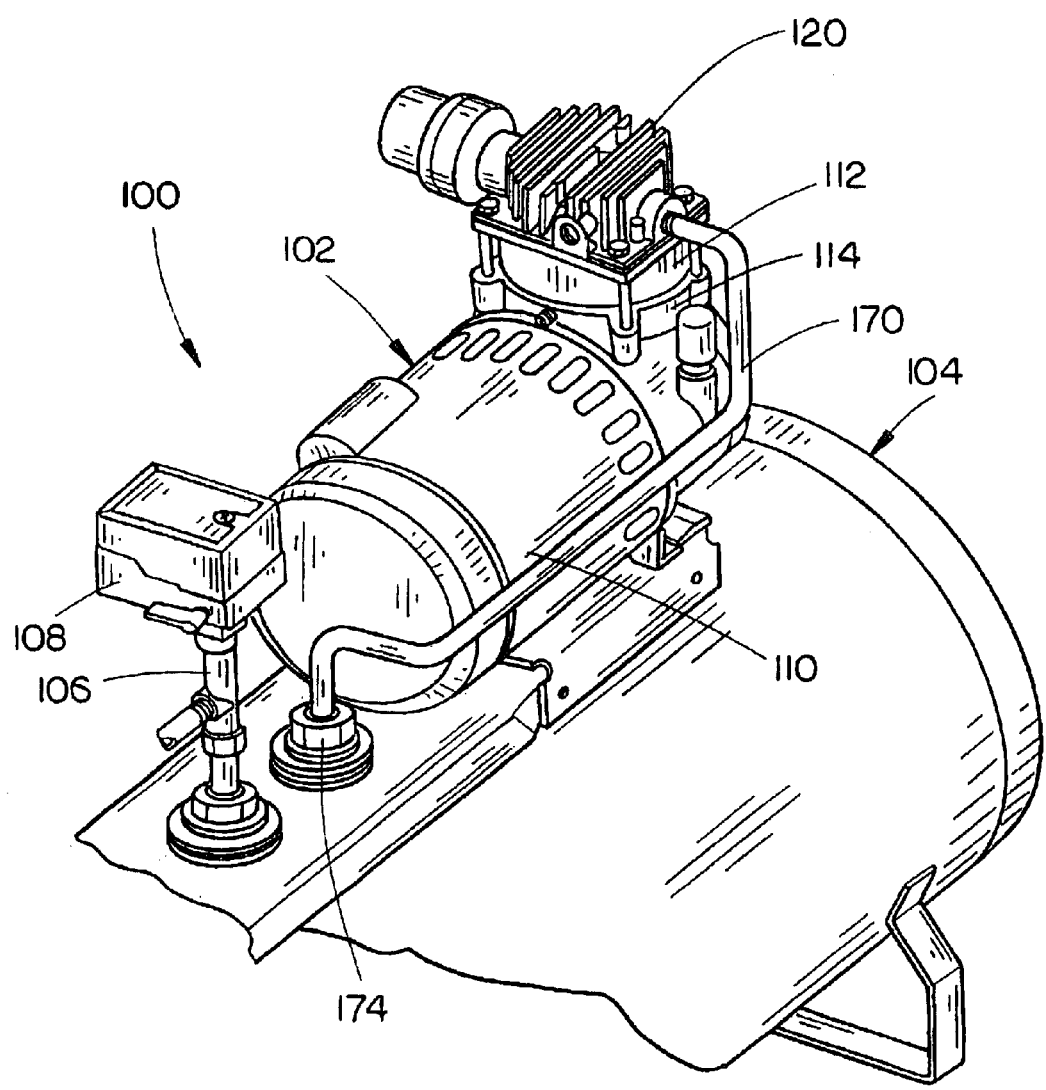
FIG. 1 is a partial isometric view illustrating an air compressor including a compressor having a head assembly employing a head pressure relief assembly in accordance with exemplary embodiments of the present invention.

FIG. 1 depicts an air compressor 100 in accordance with an exemplary embodiment of the present invention. The air compressor 100 includes a compressor assembly 102 mounted to a compressed air storage tank 104. The compressed air storage tank 104 provides a reservoir or receiver for storing air under pressure. A port (often referred to as a "spud") is provided in the compressed air storage tank 104 to which a pressure manifold or pipe 106 is fitted allowing compressed air to be drawn from the tank 104 for powering air powered tools such as nailing tools, socket driving tools, material shaping tools, sanding tools, spray painting tools, tire inflation chucks, and the like.

A pressure switch assembly 108 is mounted to the pressure manifold 106 for regulating pressure within the compressed air storage tank 104 by alternately starting and stopping the compressor assembly 102 to periodically replenish the supply of air in the tank 104. When pressure within the tank 104 reaches a preset low pressure point, or "kick-in pressure", the pressure switch assembly 108 starts the compressor 102 to re-pressurize the tank 104. As the pressure within the tank 104 reaches a preset high pressure point, or "kick-out pressure", the pressure switch assembly 108 stops the compressor 102 to prevent over-pressurization of the tank 104. In this manner, the pressure of the compressed air in the compressed air storage tank 104 is maintained within a range generally suitable for powering one or more air-powered tools.

The compressor assembly 102 includes an engine or motor 110 and a compressor 112 comprised of a housing 114 having a cylinder formed therein in which a piston assembly is disposed. The piston assembly is journaled to a crankshaft which couples the piston assembly to the engine or motor 110 so that the piston assembly may be reciprocated within the cylinder for compressing air to a desired pressure for charging the compressed air storage tank 104. The compressor 112 further includes a head assembly 120 coupled to a boss formed in the housing 114 so as to enclose the cylinder formed therein. The head assembly 120 supplies atmospheric air to the piston assembly disposed in the compressor 112 and delivers compressed air from the piston assembly to charge the compressed air storage tank 104 via a connecting tube 170 and a check valve 174.

Figure 2:
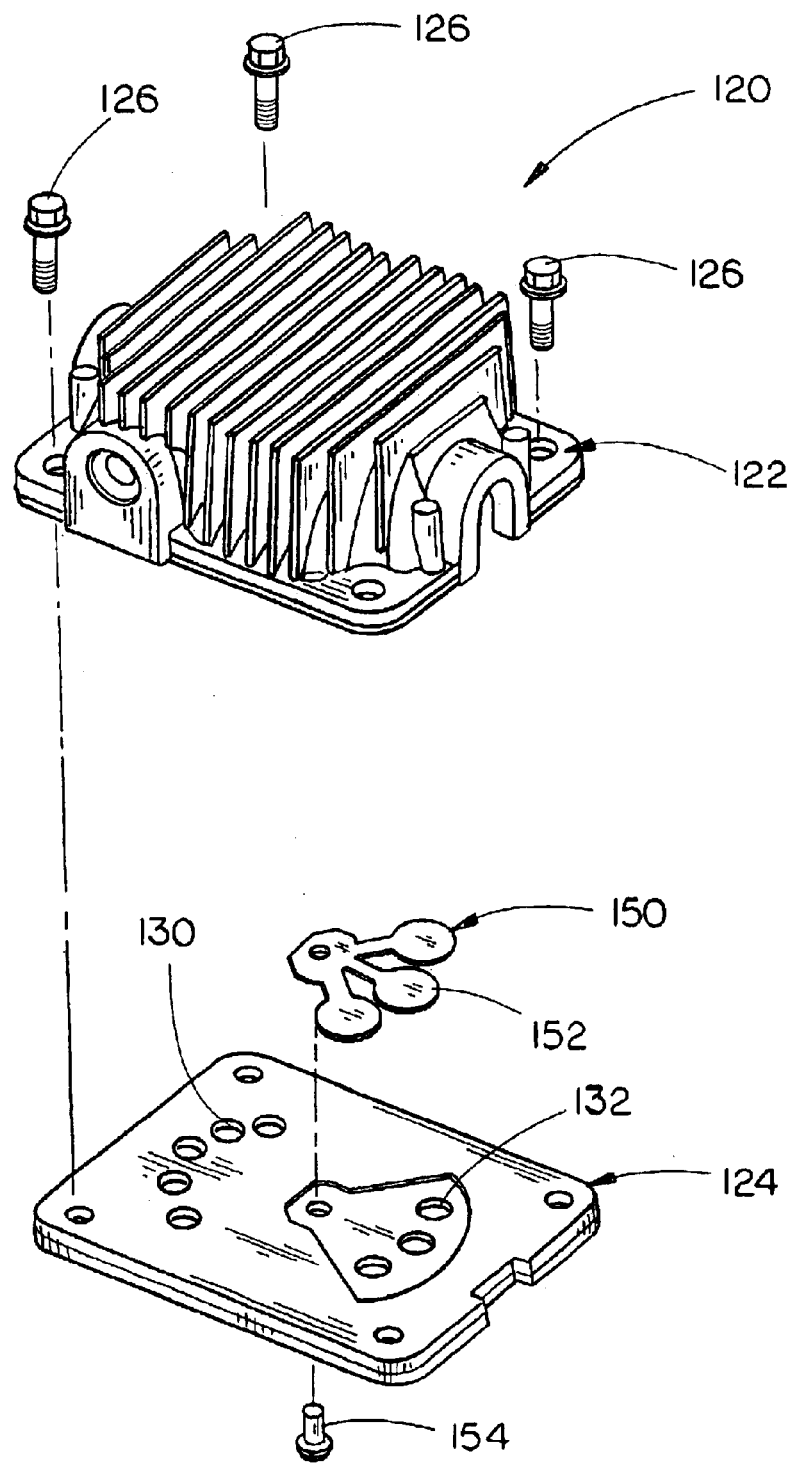
FIG. 2 is an exploded isometric view showing the head assembly shown in FIG. 1, further illustrating a head pressure relief assembly in accordance with an exemplary embodiment of the present invention.

Turning now to FIGS. 2 though 5, the head assembly 120 shown in FIG. 1 is described. Head assembly 120 includes a housing portion 122 and a valve plate 124 that are coupled to the housing 114 of compressor 112 (see FIG. 1) via fasteners 126 so that the valve plate 124 is disposed between the housing portion 122 and compressor housing 114. The head assembly 120 includes an intake cavity 146 (FIGS. 3 and 4) through which air generally at atmospheric pressure may enter the cylinder of compressor 112 and an exhaust cavity 128 (FIGS. 3 and 4) for receiving air from the cylinder that has been compressed by the piston assembly. The valve plate 124 includes one or more intake ports 130, which allow air at atmospheric pressure to enter the cylinder of compressor 112 during intake strokes of the piston assembly. The intake ports 130 are closed (e.g., via a flapper valve or the like) during compression strokes of the piston assembly. The valve plate 124 also includes one or more exhaust ports 132, which allow compressed air to enter the exhaust cavity 128 from the cylinder during compression strokes of the piston assembly.

In accordance with an exemplary embodiment of the present invention, the head assembly 120 may include an exhaust valve post 134 formed in housing portion 122. In the exemplary embodiment shown in FIGS. 3 and 4, the exhaust valve post 134 extends from an outer wall 136 of housing portion 122 into exhaust cavity 128 and includes an inner end 138 disposed proximately to valve plate 124. An aperture 140 is cored through the outer wall 136 of the housing portion 122 and the exhaust valve post 134 for venting the exhaust cavity 128 of the head assembly 120 prior to startup of the compressor assembly 102 (i.e., when engine or motor 110 is started to reciprocate the piston assembly of the compressor 112). In the exemplary embodiment shown, the exhaust valve post 134 is integrally formed in the housing body 122 of the head assembly 120. Alternately, the exhaust valve post 134 may be manufactured as a separate component and coupled to the housing body 122 using suitable fasteners such as bolts, screws, welds, or the like.

An exhaust valve assembly 150 is mounted to the valve plate 124 of head assembly 120. The exhaust valve assembly 150 is comprised of a flapper valve 152 attached to the valve plate 124 via a suitable fastener such as rivet 154 or the like, so as to extend into exhaust cavity 128. In the exemplary embodiment shown, the flapper valve 152 includes a first or base end 156 having an aperture 158 formed therein for receiving the rivet 154 coupling the flapper valve 152 to the valve plate 124. One or more valve members 160 extend from the base end 156 in a generally radial fashion. Each valve member 160 includes a second end 162 coupled to the base end 156 via a flexible or resilient arm 164. Preferably, the second end 162 of each valve member 160, which in one embodiment, may be generally circular in shape, is disposed over a respective exhaust port 132 formed in the valve plate 124. At least one of the valve members 160 is also positioned for engaging the end surface 138 of the exhaust valve post 124 when opened (FIG. 4).

Figure 3:
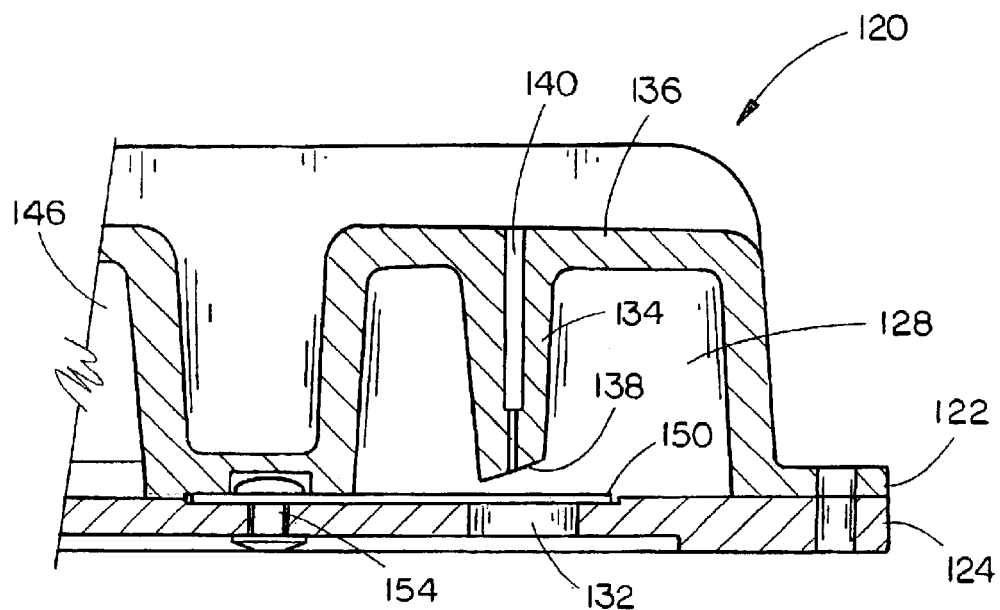
FIG. 3 is a cross-sectional side elevation view of the head assembly shown in FIG. 2, illustrating exemplary operation of the head pressure relief assembly, wherein the exhaust valve assembly is closed.
Figure 4:
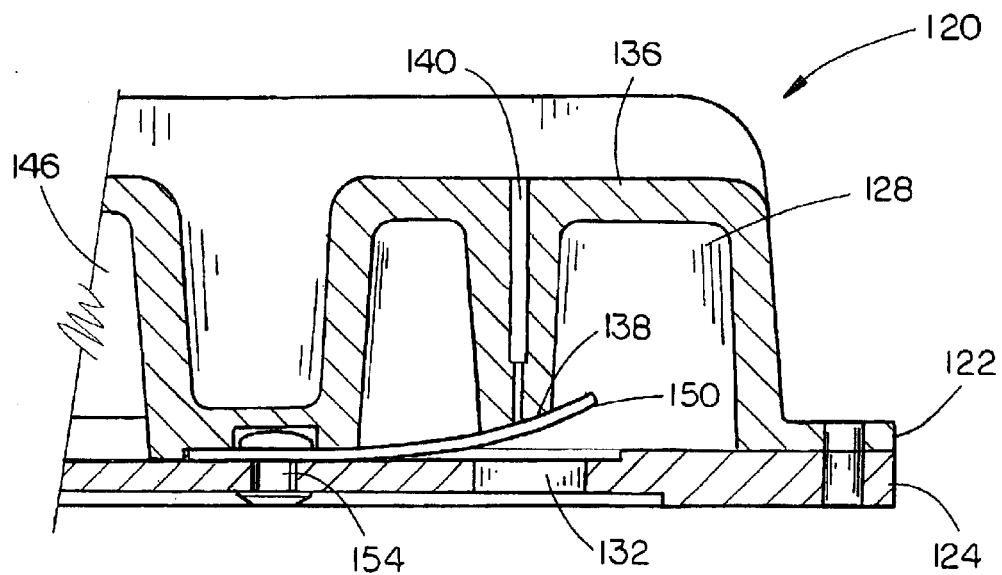
FIG. 4 is a cross-sectional side elevation view of the head assembly shown in FIG. 2, illustrating exemplary operation of the head pressure relief assembly, wherein the exhaust valve assembly is open during a compression stroke of the compressor piston.
Figure 5:
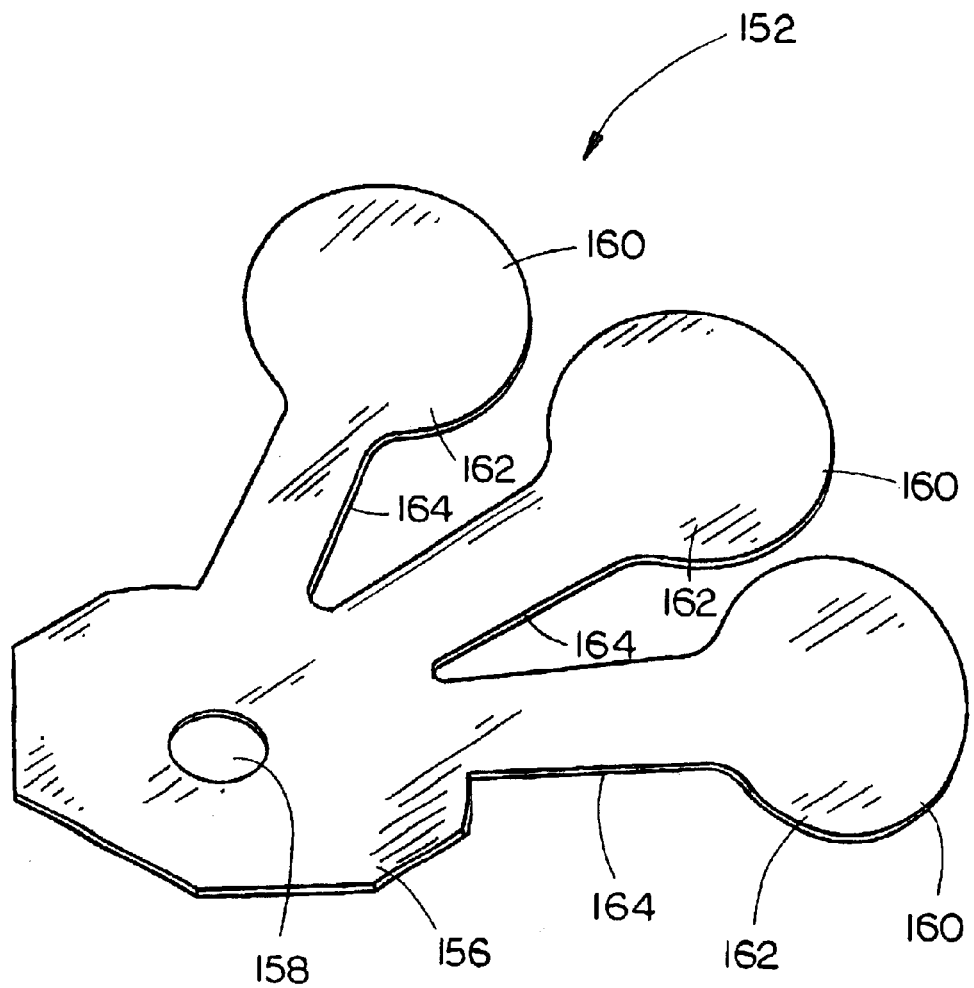
FIG. 5 is an isometric view illustrating the flapper valve of the head pressure relief assembly shown in FIGS. 2, 3 and 4.

As shown in FIGS. 3 and 4, the valve member 160 that engages exhaust valve post 124 may flex between a first position, shown in FIG. 3, wherein the second end 162 is spaced apart from the end surface 138 of exhaust valve post 134, and a second position, shown in FIG. 4, wherein the second end 162 engages the surface 138 of exhaust valve post 134 for covering the aperture 140 formed therein. In exemplary embodiments, the surface 138 of exhaust valve post 134 may be angled with respect to the valve plate 124 allowing the surface to be more fully engaged by the second end 162 of the valve member 160 to provide a better seal between the surface 124 and the second end 162.

As shown in FIG. 3, the resilient arm 164 of the valve member 160 positioned to engage the exhaust valve post 134 is biased so that the second end 162 of the valve member 160 is generally spaced apart from the surface 138 of the exhaust valve post 134 during intake strokes of the compressor piston assembly or during periods when the compressor 120 is idle. In this manner, compressed air within the exhaust cavity 128 is allowed to vent through the aperture 140 formed in the exhaust valve post 134. This venting allows the pressure within the exhaust cavity 128 to be relieved (e.g., generally reduced to atmospheric pressure) unloading the head assembly 120 to reduce the load placed on the engine or motor during startup of the compressor. During intake strokes of the piston assembly, the flapper valve 152 may further be drawn against the valve plate 124 for closing the exhaust ports 132 formed therein to prevent compressed air within the exhaust cavity 128 from being drawn back into the cylinder.

As shown in FIG. 4, during a compression stroke of the piston assembly of compressor 120 (FIG. 1), air pressure within the exhaust cavity forces the second end 160 of the valve member 160 against the surface 138 of the exhaust valve post 134, at least partially sealing or closing the aperture 140 formed therein for preventing air from being vented from the exhaust cavity 128 through the aperture 140. In this manner, the head pressure relief assembly of the present invention eliminates the need for a switch unloader and pressure relief tube commonly used in prior air compressors. However, the head pressure relief assembly also eliminates losses in air pressure during the compression stroke of the piston assembly of the compressor 120, greatly increasing the efficiency of the compressor 120.

Figure 6:
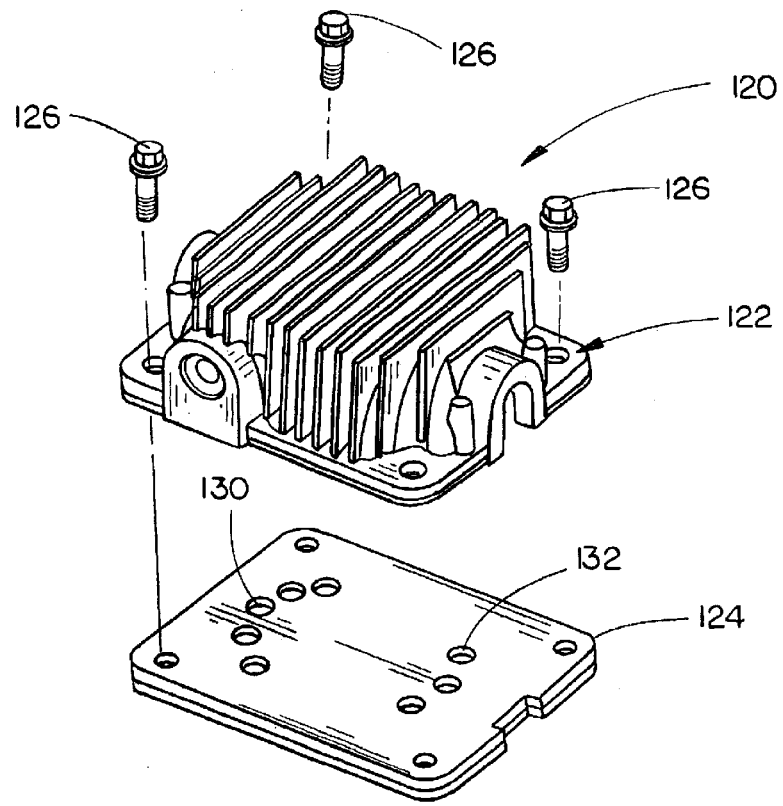
FIG. 6 is an exploded isometric view showing the head assembly shown in FIG. 1, further illustrating a head pressure relief assembly in accordance with another exemplary embodiment of the present invention.
Figure 7:
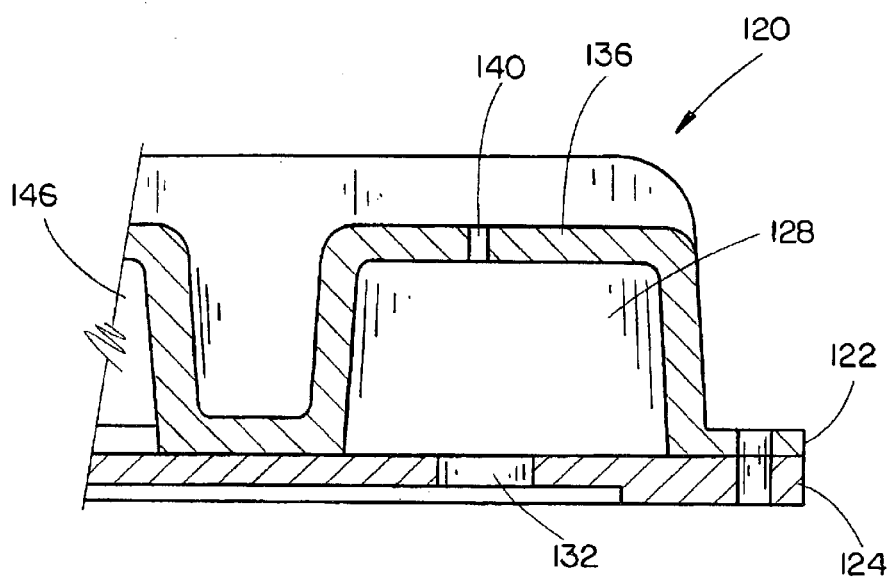
FIG. 7 is a cross-sectional side elevation view of the head assembly shown in FIG. 6.

Turning now to FIGS. 6 and 7, the head assembly 120 shown in FIG. 1 is described in accordance with another exemplary embodiment of the present invention. Head assembly 120 may include a housing portion 122 and a valve plate 124 that are coupled to the housing 114 of compressor 112 (see FIG. 1) via fasteners 126 so that the valve plate 124 is disposed between the housing portion 122 and compressor housing 114. The head assembly 120 may include an intake cavity 146 (FIG. 7) through which air generally at atmospheric pressure may enter the cylinder of compressor 112 and an exhaust cavity 128 (FIG. 7) for receiving air from the cylinder that has been compressed by the piston assembly. The valve plate 124 may include one or more intake ports 130, which allow air at atmospheric pressure to enter the cylinder of compressor 112 during intake strokes of the piston assembly. The intake ports 130 are closed (e.g., via a flapper valve or the like) during compression strokes of the piston assembly. The valve plate 124 also includes one or more exhaust ports 132, which allow compressed air to enter the exhaust cavity 128 from the cylinder during compression strokes of the piston assembly.

The head assembly 120 may include an aperture 140 cored through the outer wall 136 of the housing portion 122 for venting the exhaust cavity 128 of the head assembly 120 prior to startup of the compressor assembly 102 (i.e., when engine or motor 110 is started to reciprocate the piston assembly of the compressor 112). In this manner, compressed air within the exhaust cavity 128 is allowed to vent through the aperture 140. This venting allows the pressure within the exhaust cavity 128 to be relieved (e.g., generally reduced to atmospheric pressure) unloading the head assembly 120 to reduce the load placed on the engine or motor during startup of the compressor. In this manner, the head pressure relief assembly of the present invention eliminates the need for a switch unloader and pressure relief tube commonly used in prior air compressors.

Figure 8:
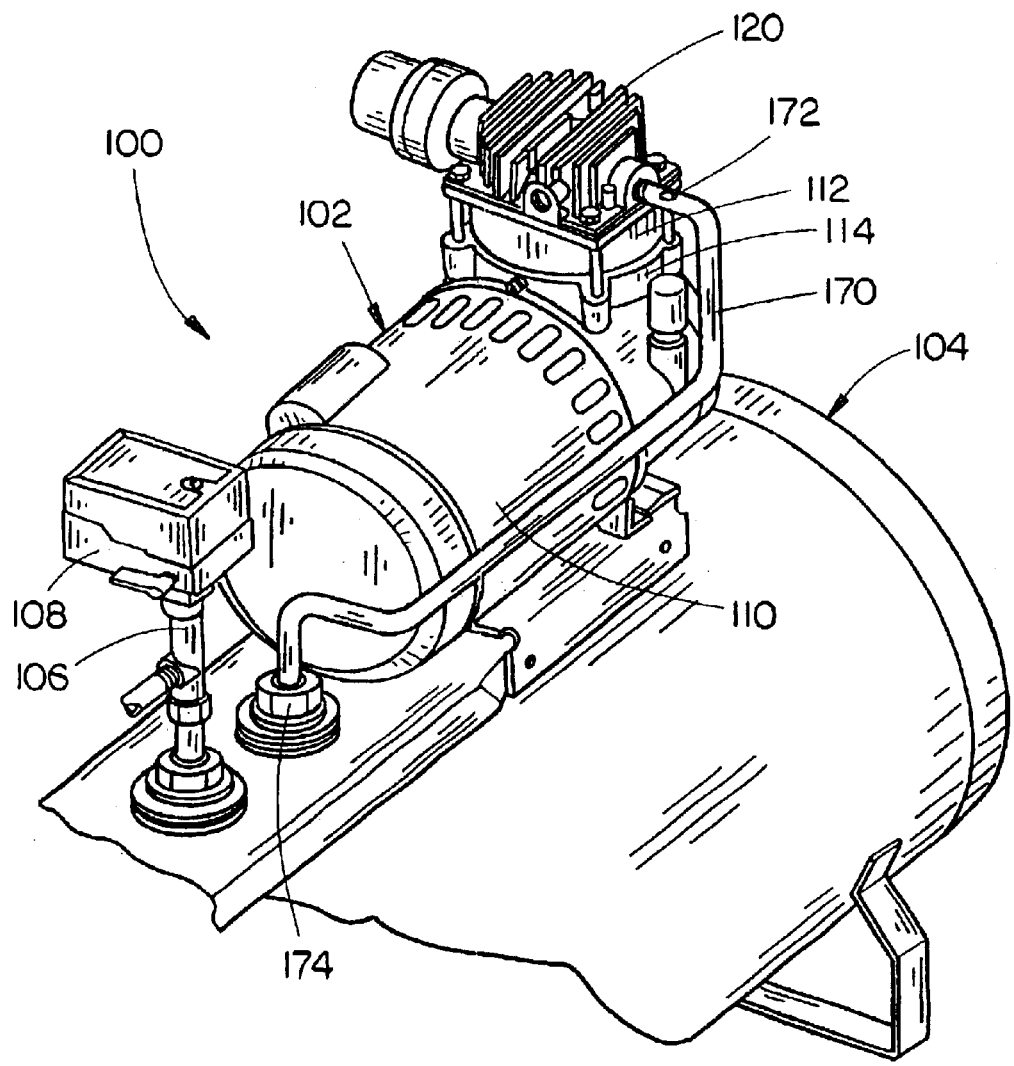
FIG. 8 is a partial isometric view illustrating an air compressor including a compressor having a head assembly, employing a head pressure relief assembly including a hole in a connecting tube in accordance with an exemplary embodiment of the present invention.

Turning now to FIG. 8, an air compressor 100 in accordance with a further exemplary embodiment of the present invention is depicted. The air compressor 100 includes a compressor assembly 102 mounted to a compressed air storage tank 104. The compressed air storage tank 104 provides a reservoir or receiver for storing air under pressure. A spud is provided in the compressed air storage tank 104 to which a pressure manifold or pipe 106 is fitted allowing compressed air to be drawn from the tank 104 for powering air powered tools.

A pressure switch assembly 108 is mounted to the pressure manifold 106 for regulating pressure within the compressed air storage tank 104 by alternately starting and stopping the compressor assembly 102 to periodically replenish the supply of air in the tank 104. When pressure within the tank 104 reaches a kick-in pressure, the pressure switch assembly 108 starts the compressor 102 to re-pressurize the tank 104. As the pressure within the tank 104 reaches kick-out pressure, the pressure switch assembly 108 stops the compressor 102 to prevent over-pressurization of the tank 104. In this manner, the pressure of the compressed air in the compressed air storage tank 104 is maintained within a range generally suitable for powering one or more air-powered tools.

The compressor assembly 102 includes an engine or motor 110 and a compressor 112 comprised of a housing 114 having a cylinder formed therein in which a piston assembly is disposed. The piston assembly is journaled to a crankshaft which couples the piston assembly to the engine or motor 110 so that the piston assembly may be reciprocated within the cylinder for compressing air to a desired pressure for charging the compressed air storage tank 104. The compressor 112 further includes a head assembly 120 coupled to a boss formed in the housing 114 so as to enclose the cylinder formed therein. The head assembly 120 supplies atmospheric air to the piston assembly disposed in the compressor 112 and delivers compressed air from the piston assembly to charge the compressed air storage tank 104 via a connecting tube 170 and a check valve 174.

The connecting tube 170 coupled to the head assembly 120 and the check valve 174 may include an aperture 172 cored in the connecting tube 170 for venting the exhaust cavity 128 of the head assembly 120 prior to startup of the compressor assembly 102 (i.e., when engine or motor 110 is started to reciprocate the piston assembly of the compressor 112). In this manner, compressed air within the exhaust cavity 128 is allowed to vent through the aperture 172. This venting allows the pressure within the exhaust cavity 128 to be relieved (e.g., generally reduced to atmospheric pressure) unloading the head assembly 120 to reduce the load placed on the engine or motor during startup of the compressor. In this manner, the head pressure relief assembly of the present invention eliminates the need for a switch unloader and pressure relief tube commonly used in prior air compressors. While the aperture 172 is shown next to the head assembly 120 in the present embodiment, one of ordinary skill in the art may contemplate coring the aperture 172 at any point between the head assembly 120 and the check valve 174.

Figure 9:
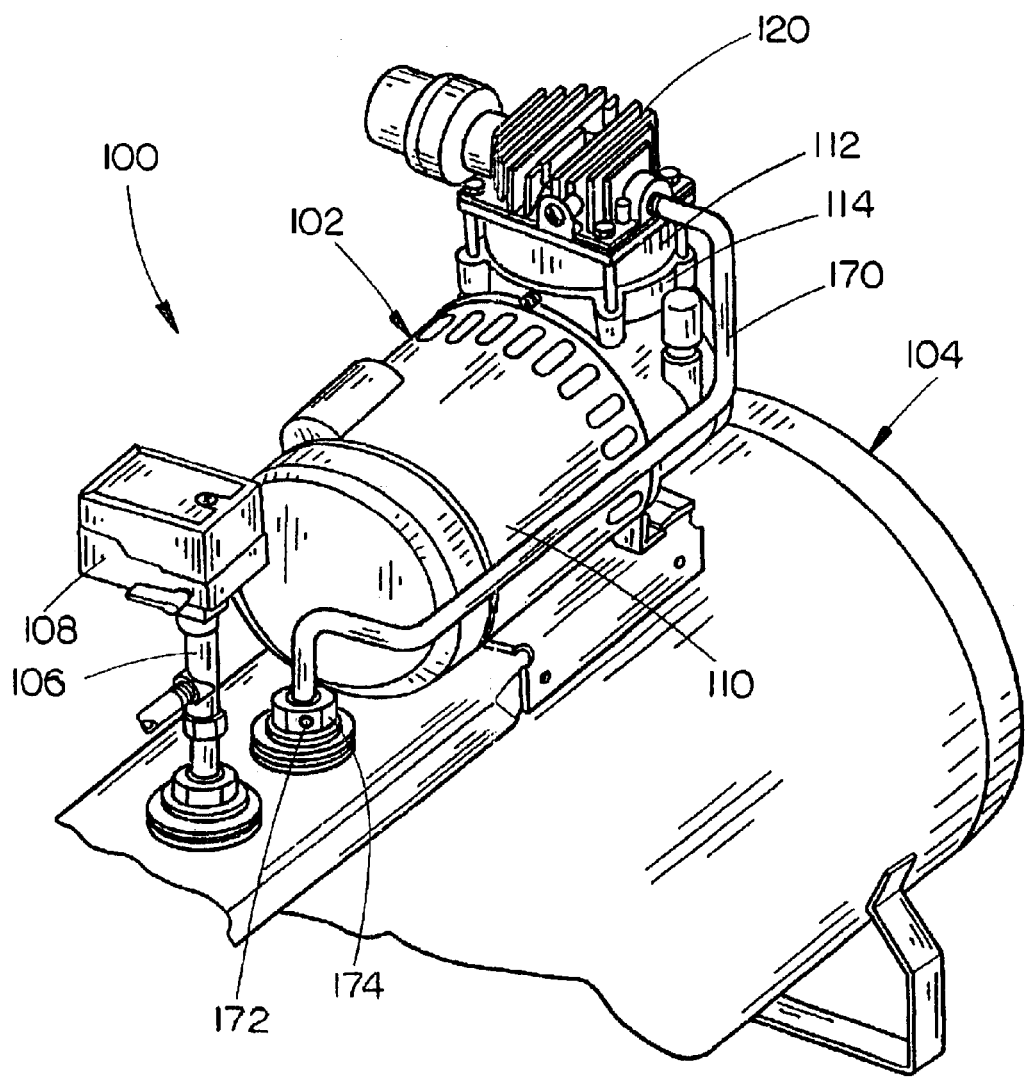
FIG. 9 is a partial isometric view illustrating an air compressor including a compressor having a head assembly, employing a head pressure relief assembly including a hole in a check valve in accordance with an exemplary embodiment of the present invention.

Turning now to FIG. 9, an air compressor 100 in accordance with a still further exemplary embodiment of the present invention is depicted. The air compressor 100 includes a compressor assembly 102 mounted to a compressed air storage tank 104. The compressed air storage tank 104 provides a reservoir or receiver for storing air under pressure. A spud is provided in the compressed air storage tank 104 to which a pressure manifold or pipe 106 is fitted allowing compressed air to be drawn from the tank 104 for powering air powered tools.

A pressure switch assembly 108 is mounted to the pressure manifold 106 for regulating pressure within the compressed air storage tank 104 by alternately starting and stopping the compressor assembly 102 to periodically replenish the supply of air in the tank 104. When pressure within the tank 104 reaches a kick-in pressure, the pressure switch assembly 108 starts the compressor 102 to re-pressurize the tank 104. As the pressure within the tank 104 reaches kick-out pressure, the pressure switch assembly 108 stops the compressor 102 to prevent over-pressurization of the tank 104. In this manner, the pressure of the compressed air in the compressed air storage tank 104 is maintained within a range generally suitable for powering one or more air-powered tools.

The compressor assembly 102 includes an engine or motor 110 and a compressor 112 comprised of a housing 114 having a cylinder formed therein in which a piston assembly is disposed. The piston assembly is journaled to a crankshaft which couples the piston assembly to the engine or motor 110 so that the piston assembly may be reciprocated within the cylinder for compressing air to a desired pressure for charging the compressed air storage tank 104. The compressor 112 further includes a head assembly 120 coupled to a boss formed in the housing 114 so as to enclose the cylinder formed therein. The head assembly 120 supplies atmospheric air to the piston assembly disposed in the compressor 112 and delivers compressed air from the piston assembly to charge the compressed air storage tank 104 via a connecting tube 170 and a check valve 174.

The check valve 174 coupled to the connecting tube 170 and the compressed air storage tank 104 may include an aperture 172 cored in the compressed air supply side of the check valve 174 for venting the exhaust cavity 128 of the head assembly 120 prior to startup of the compressor assembly 102 (i.e., when engine or motor 110 is started to reciprocate the piston assembly of the compressor 112). In this manner, compressed air within the exhaust cavity 128 is allowed to vent through the aperture 172. This venting allows the pressure within the exhaust cavity 128 to be relieved (e.g., generally reduced to atmospheric pressure) unloading the head assembly 120 to reduce the load placed on the engine or motor during startup of the compressor. In this manner, the head pressure relief assembly of the present invention eliminates the need for a switch unloader and pressure relief tube commonly used in prior air compressors.

Based on the foregoing description, it will be apparent to one of ordinary skill in the art that apertures (such as aperture 140, aperture 172) may be formed elsewhere within the head assembly 120, the connecting tube 170, the check valve 174, or, alternatively in any fittings there between. Such positioning of the aperture would not depart from the scope and intent of the present invention.

It is believed that the present invention and many of its attendant advantages will be understood by the forgoing description, and it will be apparent that various changes may be made in the form, construction and arrangement of the components thereof without departing from the scope and spirit of the invention or without sacrificing all of its material advantages, the form herein before described being merely an explanatory embodiment thereof. It is the intention of the following claims to encompass and include such changes.

What is claimed is:

1. A head pressure relief assembly for relieving pressure in a head assembly of an air compressor, comprising:
   an exhaust valve post formed in the head assembly, the exhaust valve post having an aperture formed therein for venting the head assembly; and
   an exhaust valve assembly for engaging said exhaust valve post to at least partially close the aperture;
   wherein the exhaust valve assembly is suitable for at least partially preventing flow from the head assembly through the aperture when the exhaust valve assembly is engaged with the exhaust valve post.

2. The head pressure relief assembly as claimed in claim 1, further comprising a valve plate for supporting the exhaust valve assembly.

3. The head pressure relief assembly as claimed in claim 2, wherein the exhaust valve assembly comprises a flapper valve.

4. The head pressure relief assembly as claimed in claim 3, wherein the flapper valve comprises a valve member having a first end coupled to the valve plate and a second end suitable for engaging the exhaust valve post coupled to the first end by a flexible arm, the valve member being capable of flexing between a first position wherein the second end engages the exhaust valve post for covering the aperture and a second position wherein the second end is spaced apart from the exhaust valve post.

5. The head pressure relief assembly as claimed in claim 4, wherein the second end is generally circular in shape.

6. The head pressure relief assembly as claimed in claim 1, wherein the exhaust valve post comprises a surface formed about the aperture and shaped to be engaged by the exhaust valve.

7. The head pressure relief assembly as claimed in claim 6, wherein the surface is angled.

8. A head assembly for an air compressor, comprising:
   an exhaust valve post formed in the head assembly, the exhaust valve post having an aperture formed therein for venting the head assembly; and
   a exhaust valve assembly for engaging the exhaust valve post to at least partially close the aperture;
   wherein the exhaust valve assembly is suitable for preventing flow from the head assembly through the aperture when the exhaust valve assembly is engaged with the exhaust valve post.

9. The head assembly as claimed in claim 8, further comprising a valve plate for supporting the exhaust valve assembly.

10. The head assembly as claimed in claim 9, wherein the exhaust valve assembly comprises a flapper valve.

11. The head assembly as claimed in claim 10, wherein the flapper valve comprises valve member having a first end coupled to the valve plate and a second end suitable for engaging the exhaust valve post coupled to the first end by a flexible arm, the valve member being capable of flexing between a first position wherein the second end engages the exhaust valve post for covering the aperture and a second position wherein the second end is spaced apart from the exhaust valve post.

12. The head assembly as claimed in claim 11, wherein the second end is generally circular in shape.

13. The head assembly as claimed in claim 8, wherein the exhaust valve post comprises a surface formed about the aperture and shaped to be engaged by the exhaust valve.

14. The head assembly as claimed in claim 13, wherein the surface is angled.

15. An air compressor, comprising:
   a head assembly;
   an exhaust valve post formed in the head assembly, the exhaust valve post having an aperture formed therein for venting the head assembly; and
   a exhaust valve assembly for engaging the exhaust valve post to at least partially close the aperture;
   wherein the exhaust valve assembly is suitable for preventing flow from the head assembly through the aperture when the exhaust valve assembly is engaged with the exhaust valve post.

16. The air compressor as claimed in claim 15, further comprising a valve plate for supporting the exhaust valve assembly.

17. The air compressor as claimed in claim 16, wherein the exhaust valve assembly comprises a flapper valve.

18. The air compressor as claimed in claim 17, wherein the flapper valve comprises valve member having a first end coupled to the valve plate and a second end suitable for engaging the exhaust valve post coupled to the first end by a flexible arm, the valve member being capable of flexing between a first position wherein the second end engages the exhaust valve post for covering the aperture and a second position wherein the second end is spaced apart from the exhaust valve post.

19. The air compressor as claimed in claim 18, wherein the second end is generally circular in shape.

20. The air compressor as claimed in claim 15, wherein the exhaust valve post comprises a surface formed about the aperture and shaped to be engaged by the exhaust valve.

21. The air compressor as claimed in claim 20, wherein the surface is angled.

* * * * *